(12) United States Patent
Lee et al.

(10) Patent No.: US 7,369,118 B2
(45) Date of Patent: May 6, 2008

(54) MAGNETIC OSCILLATION METRIC CONTROLLER

(75) Inventors: Wen-Chin Lee, Taipei (TW); Hsiang-Kuang Chen, Taipei (TW)

(73) Assignees: Gimbal Technology Co., Ltd., Taipei (TW); Sunrex Technology Corp., Taichung Hsien (TW)

( * ) Notice: Subject to any disclaimer, the term of this patent is extended or adjusted under 35 U.S.C. 154(b) by 606 days.

(21) Appl. No.: 10/996,459

(22) Filed: Nov. 26, 2004

(65) Prior Publication Data

US 2006/0114229 A1    Jun. 1, 2006

(51) Int. Cl.
*G09G 5/08* (2006.01)
(52) U.S. Cl. ................ 345/157; 345/184; 345/156
(58) Field of Classification Search .......... 345/156, 345/157, 184, 161, 163, 164; 341/35; 273/148
See application file for complete search history.

(56) References Cited

U.S. PATENT DOCUMENTS

| | | | | |
|---|---|---|---|---|
| 6,075,518 A | * | 6/2000 | Pruchniak | 345/157 |
| 2004/0150623 A1 | * | 8/2004 | Ledbetter et al. | 345/163 |
| 2005/0179661 A1 | * | 8/2005 | Bohn | 345/163 |
| 2006/0108999 A1 | * | 5/2006 | Lee et al. | 324/207.2 |
| 2006/0109246 A1 | * | 5/2006 | Lee et al. | 345/163 |
| 2006/0114228 A1 | * | 6/2006 | Lee et al. | 345/163 |
| 2006/0114230 A1 | * | 6/2006 | Lee et al. | 345/165 |

* cited by examiner

*Primary Examiner*—Sumati Lefkowitz
*Assistant Examiner*—Seokyun Moon
(74) *Attorney, Agent, or Firm*—Leong C. Lei

(57) ABSTRACT

A magnetic oscillation metric controller applied to computer peripheral or electronic communication system essentially operating on a scrolling wheel for lateral metric control to provide precise, consistent, reliable and programmable adjustment oscillation sensitivity by driving a permanent magnet to generate signals of changed magnetic fields resulted from displacement; and retrieving the data of changed signals for achieving metric control purpose.

3 Claims, 6 Drawing Sheets

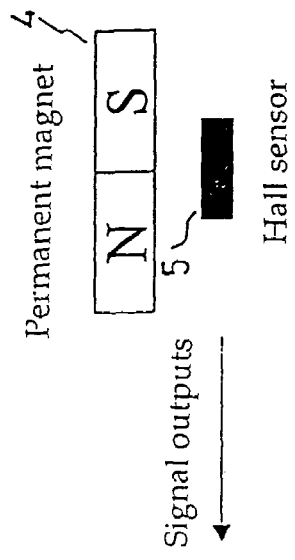
FIG. 5C
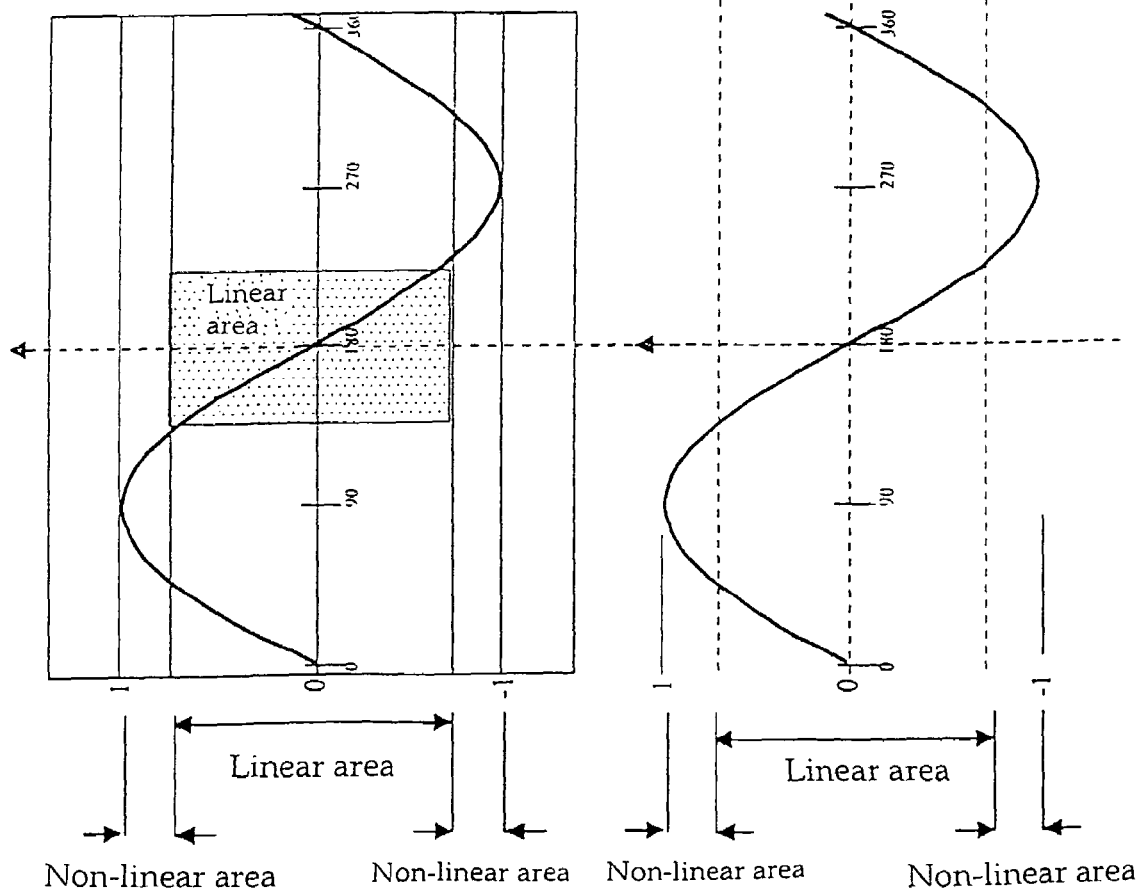
FIG. 5A
FIG. 5B

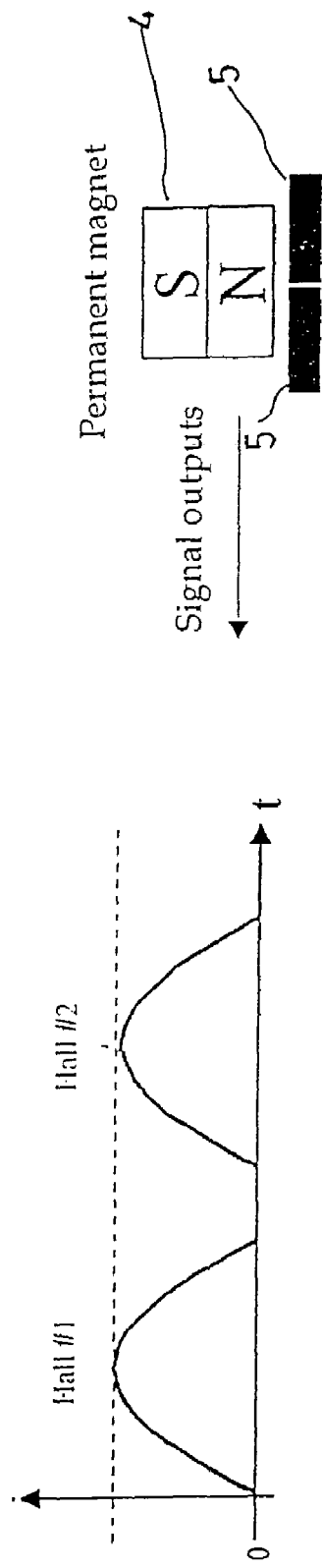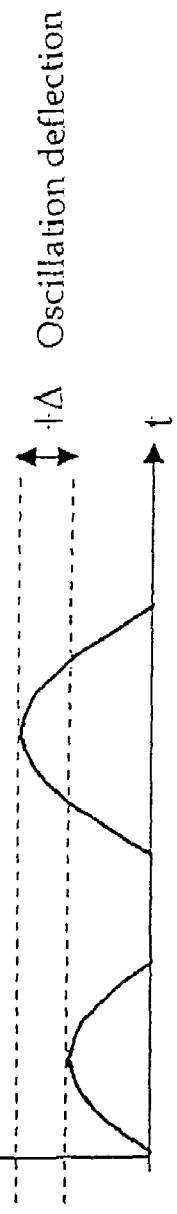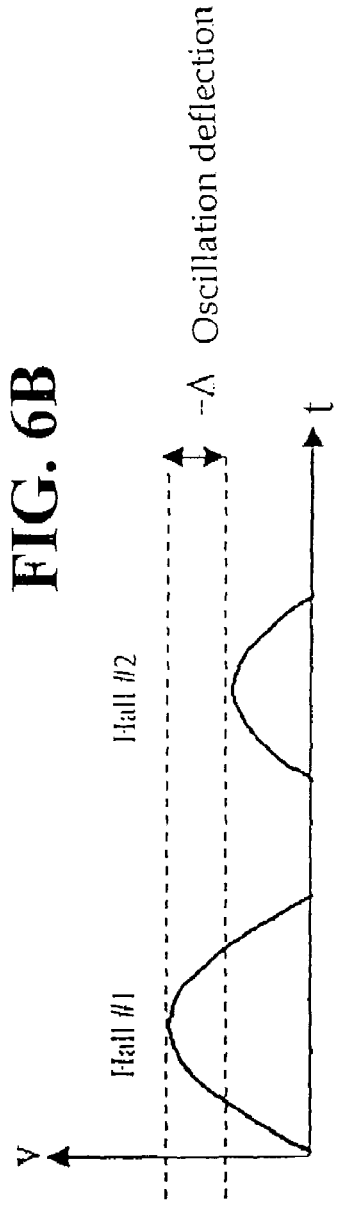

MAGNETIC OSCILLATION METRIC CONTROLLER

BACKGROUND OF THE INVENTION (a) Technical Field of the Invention

The present invention is related to a magnetic oscillation metric controller, and more particularly, to one that drives a permanent magnet to displace by oscillation thus to retrieve changed signals for metric control.

(b) Description of the Prior Art

From the keyboard at the beginning, till the introduction of cabled mouse, wireless cable or optical mouse today, many peripherals to control movement of cursor or scroll bar on monitor have been available in the history of the development of computer with the primary purpose to control three mechanisms including movement of the cursor, scrolling the screen and clicking to select.

Given with the current mouse designed with lateral scrolling function as illustrated in FIG. 7 of the accompanying drawings, a scrolling wheel mechanism (A2) is comprised of a scrolling wheel in conjunction with electronic circuit board and grating sensor device (optical grating theories) disposed within the wheel, and the longitudinal metric control is achieved by rotation forward or backward of the scrolling wheel. The design focuses on the LH and RH lateral metric control. The design illustrated in FIG. 7 has lateral control achieved by LH or RH micro-switch through LH or RH deflective movement. As illustrated, a scrolling wheel mechanism (A2) provided on a carrying mechanism (A1) of a mouse relates to one control press bar (A4) each respectively extending from LH and RH along an outer frame (A3) in relation to a LH and a RH micro-switches (A5). When the scrolling wheel mechanism (A2) deflects to the left, the press bar (A4) to its right contacts the micro-switch (A5) provided on the right wall due to the level difference. If the scrolling wheel mechanism (A2) deflects to the right, the press bar to its right contacts the micro-switch (A5) provided on the right wall also due to the level difference, thus to achieve the mouse LH and RH lateral metric function.

However, the prior art is found with the following flaws:

1. Problems with the touch mechanism. The design with the micro-switch is found with many problems including the presence of the action spacing, lower sensitivity and short service life are observed with the touch mechanism of the micro-switch.

2. Greater force needed to touch the micro-switch. This makes the operation uncomfortable putting the design of the touch micro-switch under serious criticism and trial.

3. The limited mechanical service life. Any failure or poor contact due to tear and wear of any micro-switch will frustrate the control and operation, or even prevent the micro-switch useless, thus to shorten the service life of the oscillation metric control structure that essentially operates on the micro-switch.

4. Higher production cost and more workstations in the assembly. With the comparatively more precise and complicated design, significant increase of total production is taken for granted.

5. Larger size. A pair of press bars must be provided by respectively extending from both sides of the oscillation structure to touch corresponding LH and RH micro-switches to fail the compact requirements, thus making it difficult to apply in the construction of a small size such as the mouse.

SUMMARY OF THE INVENTION

The primary purpose of the present invention is to provide a magnetic oscillation controller to eliminate flaws found with the prior art. To achieve the purpose, a Hall sensor and permanent magnet are used to exit the micro-switch to provide the following advantages:

1. Installation of the Hall sensor and the permanent magnet change the mechanical operation of the prior art into electronic operation without being subject to the service life of the switch thus to significantly increase the service life and reduce the production cost.

2. The present invention essentially operates on the signals from the magnetic filed thus to save the space otherwise occupied by LH and RH micro-switches in the prior art to significantly reduce the volume of the construction for easy application in a mouse device in smaller or special size.

3. Changes of signal from the magnetic field are synchronously generated with the oscillation, and then processed by the operation of the programs in a microprocessor, thus to allow adjustment and setup of the oscillation sensitivity for control purpose.

4. The electronic operation in the absence of micro-switch permits the oscillation sensitivity for control to be adjusted as desired by the user thus to meet the operation pattern of the individual user.

5. Signals from the magnetic field are consistent without being subject to interference from external noises, thus to provide consistent, reliable and precise control.

6. The present invention allows the adjustment of the volume and size of related devices in conjunction with the updated electronic manufacturing technology depending on the application of the information productions requiring metric and control.

The foregoing object and summary provide only a brief introduction to the present invention. To fully appreciate these and other objects of the present invention as well as the invention itself, all of which will become apparent to those skilled in the art the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIGS. 5A, 5B and 5C are schematic views of a first preferred embodiment of a permanent magnet and a Hall sensor of the present invention.

FIGS. 6A, 6B, 6C and 6D are schematic views of a second preferred embodiment of a permanent magnet and a Hall sensor of the present invention.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
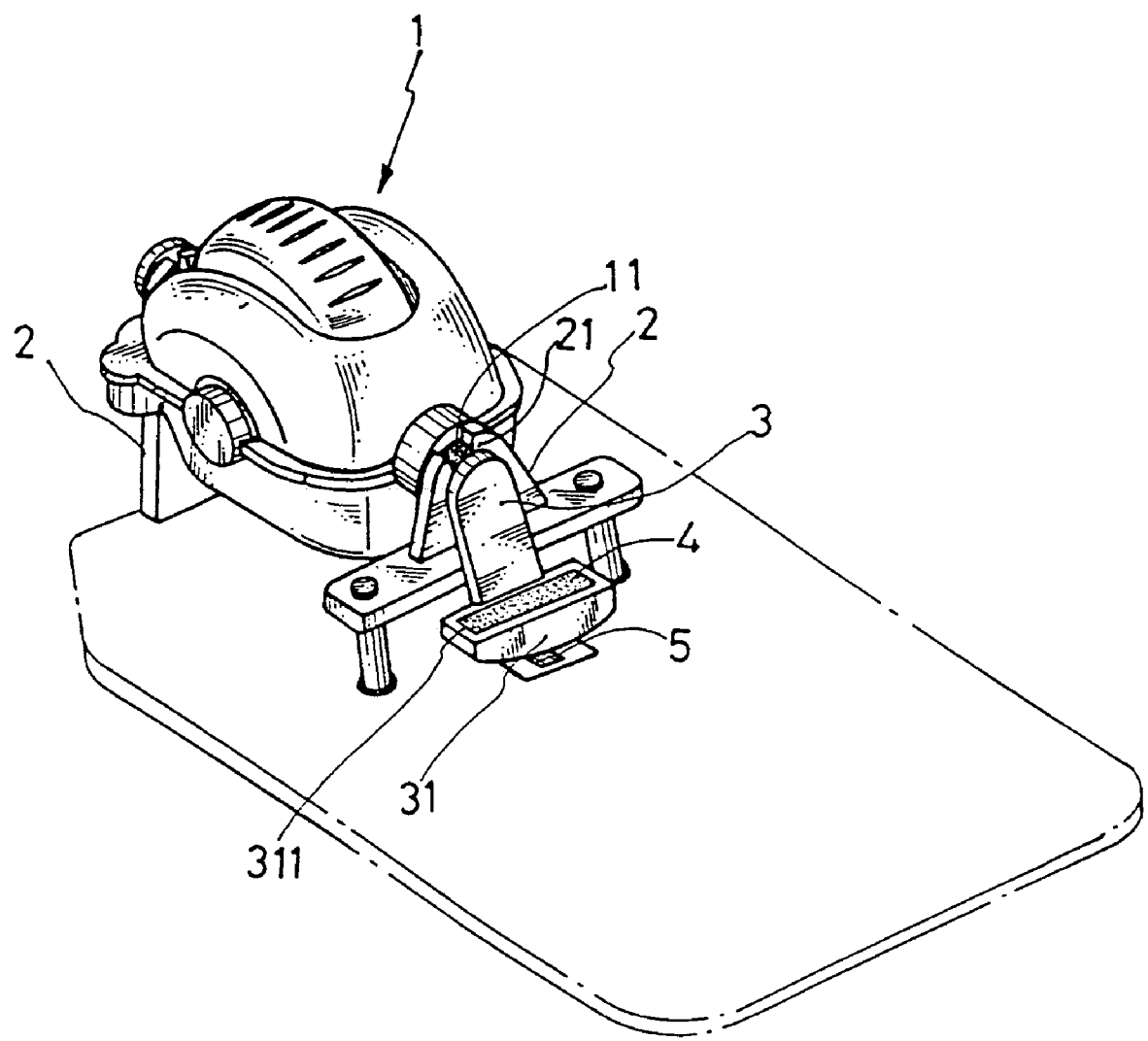
FIG. 1 is a perspective view of the present invention.

Referring to FIG. 1, a first preferred embodiment is designed exclusively for the LH and RH lateral metric controller since there is no restriction prescribed for the subject matter of application. The ultimate purpose to achieve metric control for the entire configuration is executed by oscillation driven permanent magnet displacement to induce and retrieve data of signals from changed magnetic filed. The first preferred embodiment of the present invention is essentially comprised of a scrolling wheel mechanism (1), an expansion base (2), a dancer (3), a permanent magnet (4), and a Hall sensor (5). Wherein, the scrolling wheel mechanism (1) comprised of a wheel adapted with electronic circuit board and sensor to achieve the metric operation and control by rotation clockwise and counter-clockwise is related to a prior art. A pivot (11) is each provided in front and back of the scrolling wheel mechanism (1) to stride cross and pivot into a respective slot (21) for the entire scrolling wheel mechanism (1) to provide lateral oscillation through the LH/RH control.

Figure 2:
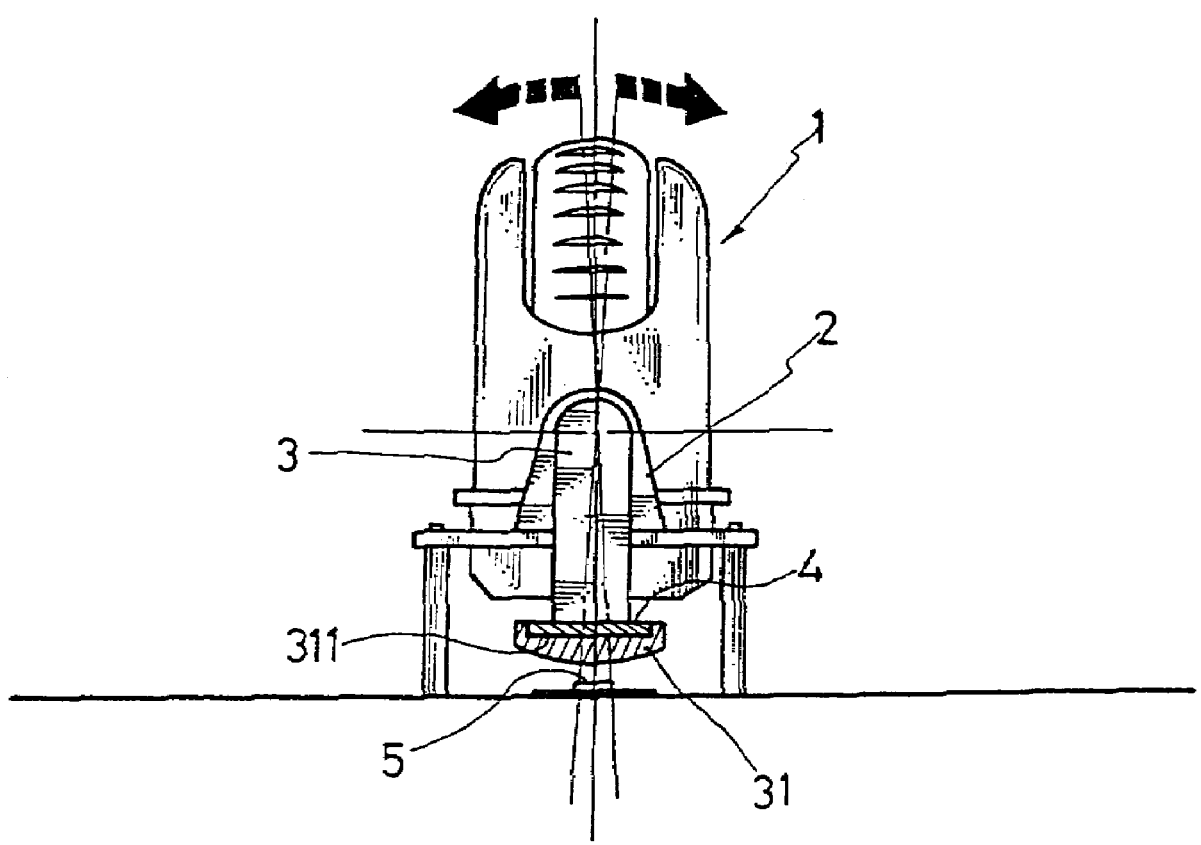
FIG. 2 is a schematic view showing the construction of a dancer of the present invention.
Figure 3:
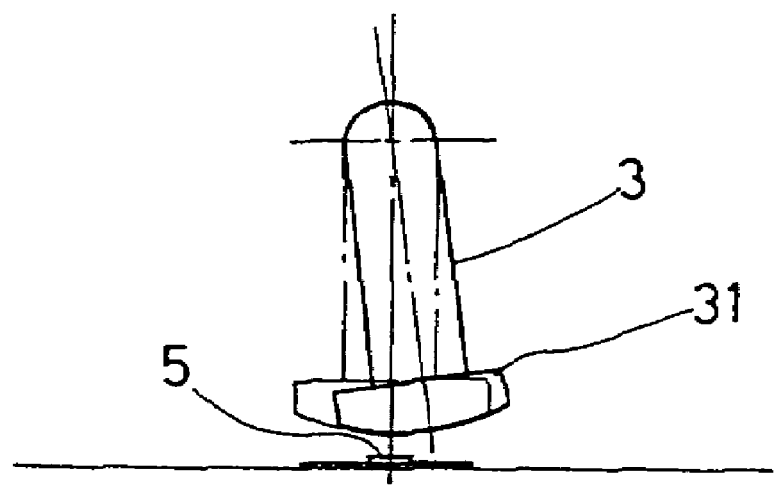
FIG. 3 is a schematic view showing the dancer of the present invention is swinging to its right.
Figure 4:
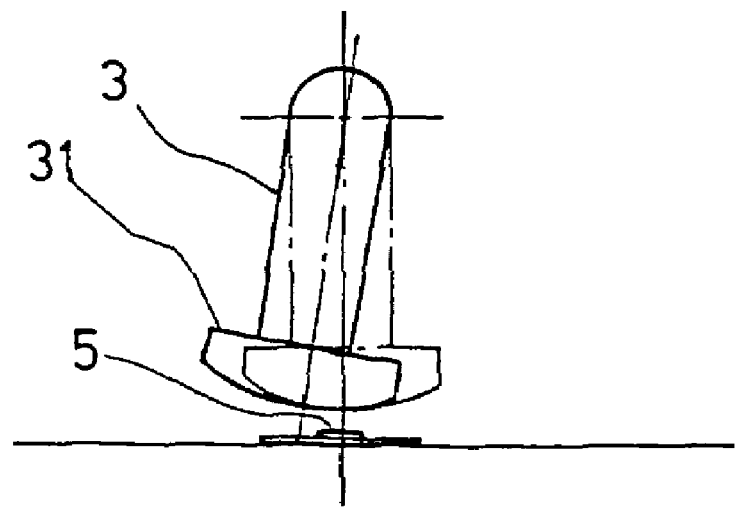
FIG. 4 is a schematic view showing the dancer of the present invention is swinging to its left.
Figure 7:
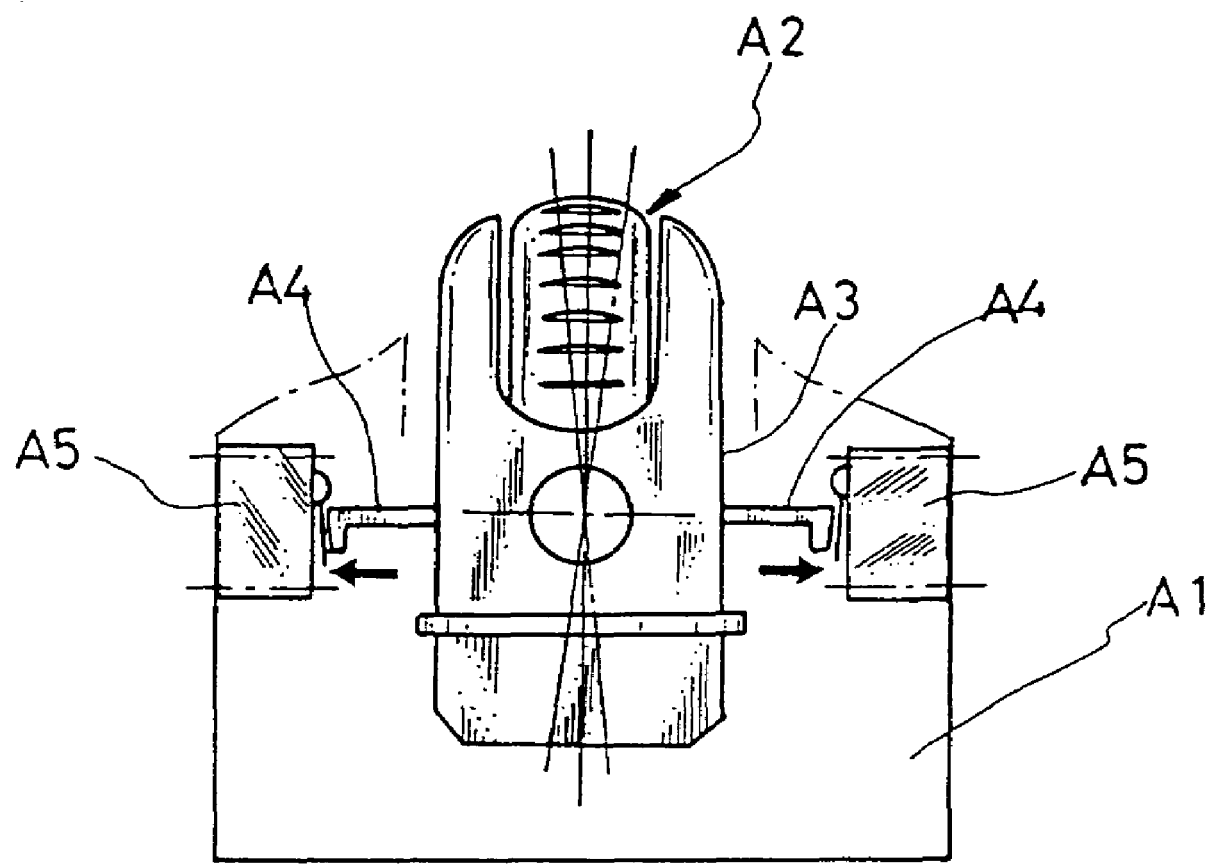
FIG. 7 is a schematic view showing LF and RH control construction of the prior art.

As illustrated in FIG. 2, the dancer (3) extends from the pivot (11) and connects to a pendant (31) containing a trough (311) to accommodate the permanent magnet (4) for the permanent magnet (4) in the trough (311) to synchronously oscillate with the dancer (4). Accordingly, the permanent magnet (4) executes oscillation mechanism to drive the permanent magnet (4) to displace and thus to create changes in the magnetic filed. The Hall sensor (5) disposed below the permanent magnet (4) retrieves signals from the changed magnetic field to execute lateral control mechanism also as illustrated in FIGS. 3 and 4.

As illustrated in FIGS. 6A, 6B, 6C, 6D and FIG. 7, the configuration of the permanent magnet (4) and the Hall sensor (5) are represented by two preferred embodiments. A first preferred embodiment as illustrated in FIG. 5 has the polarities of the permanent magnet (4) laterally arranged in N-S or S-N. A single Hall sensor (5) is located below the permanent magnet to retrieve signals of changed magnetic field resulted from the oscillating permanent magnet (4) with the waveform pattern of the outputted signals as illustrated in FIGS. 5A, 5B and 5C. The linear area in the pattern of the waveform presents the optimal signals for the judgment of the linear displacement vector while signals outside the linear area though not applied as the optimal signals in judging the displacement vector are used for judging the direction where the maximal displacement takes place. Both +Δ defection and −Δ deflection as illustrated in FIGS. 5A, 5B and SC related to the optimal linear displacement vector signal conditions serve the optimal control mechanism.

Now referring to FIGS. 6A, 6B, 6C and 6D, a second preferred embodiment of the present invention is essentially comprised of the permanent magnet (4) and the Hall sensor (5). Wherein, magnet polarities of the permanent magnet (4) are arranged in having S-pole on the upper layer and the N-pole on the lower layer (or N-pole, upper; and S-pole, lower). Two sets of Hall sensor (5) are arranged at where below the permanent magnet (4) to retrieve the signals of changed magnetic field produced by the oscillation of the permanent magnet (4) with the waveform pattern of the outputted signals as illustrated in FIGS. 6A, 6B, 6C and 6D. Similarly, both +Δ defection and −Δ deflection as illustrated in FIGS. 6A, 6B, 6C and 6D related to conditions in judging the LH and RH displacement serve the optimal control mechanism.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A magnetic oscillation metric controller is comprised of a scrolling wheel mechanism, an expansion base, a dancer, a permanent magnet, and a Hall sensor; the permanent magnet being driven by oscillation displacement to produce changes in magnetic field; a sensor retrieving signals of the changed magnetic field; a pivot being each provided in front and back of the scrolling wheel mechanism; both pivots striding over and respectively pivoted to their locking slots disposed in the front and the back of the expansion base; the dancer extending from either pivot and connected at its below a pendant; a trough being disposed in the pendant to merely accommodate the permanent magnet; the permanent magnet synchronously and laterally oscillating as driven by the scrolling wheel mechanism; and the Hall sensor disposed below the permanent magnet retrieves changed signals of the oscillation to achieve the purpose of control of lateral oscillation.

2. The magnetic oscillation metric controller of claim 1; wherein, magnetic polarities of both N- and S-poles of the permanent magnet are laterally arranged, and a single Hall sensor is provided at where below the permanent magnet.

3. The magnetic oscillation metric controller claim 1; wherein, magnetic polarities of the permanent magnet are arranged with the S-pole located at the upper layer and the N-pole located at the lower layer, or the other way around; and two sets of Hall sensors corresponding to both S- and N-poles are provided at where below the permanent magnet.

* * * * *